(12) United States Patent
Lee

(10) Patent No.: US 10,165,247 B2
(45) Date of Patent: Dec. 25, 2018

(54) IMAGE DEVICE WITH IMAGE DEFOCUS FUNCTION AND METHOD GENERATING A DEFOCUS IMAGE THEREOF

(71) Applicant: eYs3D Microelectronics, Co., Taipei (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 266 days.

(21) Appl. No.: 15/155,084

(22) Filed: May 16, 2016

(65) Prior Publication Data

US 2017/0257613 A1 Sep. 7, 2017

(30) Foreign Application Priority Data

Mar. 2, 2016 (CN) .......................... 2016 1 0117714

(51) Int. Cl.
| | |
|---|---|
| *H04N 13/128* | (2018.01) |
| *H04N 13/204* | (2018.01) |
| *H04N 13/257* | (2018.01) |
| *H04N 13/271* | (2018.01) |
| *H04N 5/232* | (2006.01) |
| *H04N 9/04* | (2006.01) |

(52) U.S. Cl.
CPC ........... *H04N 13/128* (2018.05); *H04N 5/232* (2013.01); *H04N 9/045* (2013.01); *H04N 13/204* (2018.05); *H04N 13/257* (2018.05); *H04N 13/271* (2018.05)

(58) Field of Classification Search
CPC .................................................. H04N 13/0022
See application file for complete search history.

(56) References Cited

U.S. PATENT DOCUMENTS

| | | | |
|---|---|---|---|
| 9,762,788 B2 * | 9/2017 | Komatsu ............ | H04N 5/23212 |
| 9,846,944 B2 * | 12/2017 | Ishihara .................. | G06T 7/571 |
| 9,897,792 B2 * | 2/2018 | Rout ..................... | G02B 21/367 |
| 2015/0043783 A1 * | 2/2015 | Ishihara ................ | G06T 7/0069 |
| | | | 382/106 |

(Continued)

OTHER PUBLICATIONS

Estimating spatially varying defocus blur from a single image; Zhu; 2013.*

(Continued)

*Primary Examiner* — Eileen M Adams
(74) *Attorney, Agent, or Firm* — Winston Hsu

(57) ABSTRACT

An image device with image defocus function includes an image capture unit, a depth map generation unit, and a processor. The image capture unit captures an image corresponding to an object. The depth map generation unit generates a depth map corresponding to the object. The processor determines an integration block corresponding to each pixel image of the image according to a depth of the depth map corresponding to the each pixel image and a predetermined depth corresponding to the each pixel image, utilizes the integration block to generate a defocus color pixel value corresponding to the each pixel image, and outputs a defocus image corresponding to the image according to defocus color pixel values corresponding to all pixel images of the image, wherein the each pixel image of the image corresponds to a pixel of the image capture unit.

8 Claims, 6 Drawing Sheets

(56) References Cited

U.S. PATENT DOCUMENTS

2015/0092992 A1* 4/2015 Ishihara ............ H04N 5/23212
                                                    382/106
2017/0127048 A1* 5/2017 Nobayashi ......... H04N 13/0271
2017/0257613 A1* 9/2017 Lee .................... H04N 13/0022

OTHER PUBLICATIONS

Absolute Depth Estimation from a Single Defocused Image; Liu; 2013.*

* cited by examiner

IMAGE DEVICE WITH IMAGE DEFOCUS FUNCTION AND METHOD GENERATING A DEFOCUS IMAGE THEREOF

BACKGROUND OF THE INVENTION

1. Field of the Invention

The present invention relates to an image device with image defocus function and a method generating a defocus image thereof, and particularly to an operation load and time consumption of the image device are significantly reduced when the image device and the method execute a defocus operation.

2. Description of the Prior Art

When an image device executes a bokeh processing on an image captured by the image device, the image device will execute a defocus operation on other objects of the image except a predetermined object of the image. That is to say, after the image device executes the bokeh processing on the image, the greater a distance between an object of the other objects and the predetermined object is, the blurrier a corresponding image of the object included in the image is. Please refer to FIG. 1. FIG. 1 is a diagram illustrating a size of a filter window 102 when the image device utilizes an average filtering method to execute the defocus operation in a pixel image 100 of the image, wherein the image device further generates a depth map corresponding to the image according to the image, and the pixel image 100 corresponds to a pixel of the image device. As shown in FIG. 1, when the image device executes the defocus operation on the pixel image 100, the image device first sums color pixel values of a plurality of pixel images included in the filter window 102 (e.g. as shown in FIG. 1, the image device sums color pixel values of 68 pixel images included in the filter window 102) to generate a total color pixel value corresponding to the pixel image 100, wherein a number of the plurality of pixel images is significantly increased with increase of a difference between a depth of the depth map corresponding to the pixel image 100 and a depth of the depth map corresponding to the predetermined object. After the total color pixel value corresponding to the pixel image 100 is generated, the image device averages the total color pixel value corresponding to the pixel image 100 to generate a defocus color pixel value corresponding to the pixel image 100. As shown in FIG. 1, because the image device needs to sum the color pixel values of the plurality of pixel images included in the filter window 102 to generate the total color pixel value corresponding to the pixel image 100, times of an adding operation executed by the image device will also be significantly increased with increase of the difference. Because the times of the adding operation executed by the image device will be significantly increased with increase of the difference, an operation load and time consumption of the image device will also be significantly increased. Therefore, how to reduce the operation load and the time consumption of the image device during the image device executing the defocus operation becomes an important issue for a designer of the image device.

SUMMARY OF THE INVENTION

An embodiment of the present invention provides an image device with image defocus function. The image device includes an image capture unit, a depth map generation unit, and a processor. The image capture unit is used for capturing an image corresponding to an object. The depth map generation unit is used for generating a depth map corresponding to the object. The processor is coupled to the image capture unit and the depth map generation unit for determining an integration block corresponding to each pixel image of the image according to a depth of the depth map corresponding to the each pixel image and a predetermined depth corresponding to the each pixel image, utilizing the integration block to generate a defocus color pixel value corresponding to the each pixel image, and outputting a defocus image corresponding to the image according to defocus color pixel values corresponding to all pixel images of the image, wherein the each pixel image of the image corresponds to a pixel of the image capture unit.

Another embodiment of the present invention provides a method of an image device generating a defocus image, wherein the image device includes an image capture unit, a depth map generation unit, and a processor. The method includes the image capture unit capturing an image corresponding to an object; the depth map generation unit generating a depth map corresponding to the object; the processor determining an integration block corresponding to each pixel image of the image according to a depth corresponding to the each pixel image and a predetermined depth corresponding to the each pixel image, wherein the each pixel image of the image corresponds to a pixel of the image capture unit; the processor utilizing the integration block to generate a defocus color pixel value corresponding to the each pixel image; and the processor outputting a defocus image corresponding to the image according to defocus color pixel values corresponding to all pixel images of the image.

The present invention provides an image device with image defocus function and a method generating a defocus image thereof. The image device and the method utilize a processor to determine an integration block corresponding to each pixel image of an image according to a depth of a depth map corresponding to the image corresponding to the each pixel image and a predetermined depth corresponding to the each pixel image, to generate a defocus color pixel value corresponding to the each pixel image according to the integration block corresponding to the each pixel image, and to output a defocus image corresponding to the image according to defocus color pixel values corresponding to all pixels of the image. Because an operation load of the processor generating an integral image corresponding to all pixel images of the integration block corresponding to the each pixel image is not significantly increased with increase of a difference between the depth of the depth map corresponding to the each pixel image and a depth of the depth map corresponding to a predetermined object, compared to the prior art, an operation load and time consumption of the image device will be significantly reduced when the image device and the method execute defocus operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
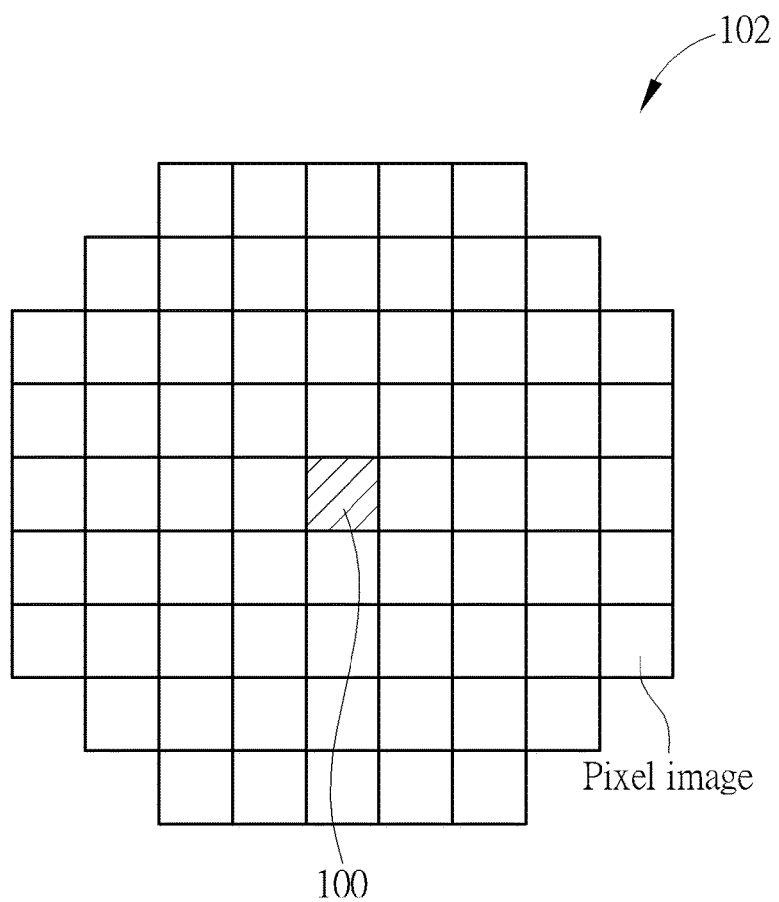
FIG. 1 is a diagram illustrating a size of a filter window when the image device utilizes an average filtering method to execute the defocus operation in a pixel image of the image.
Figure 2:
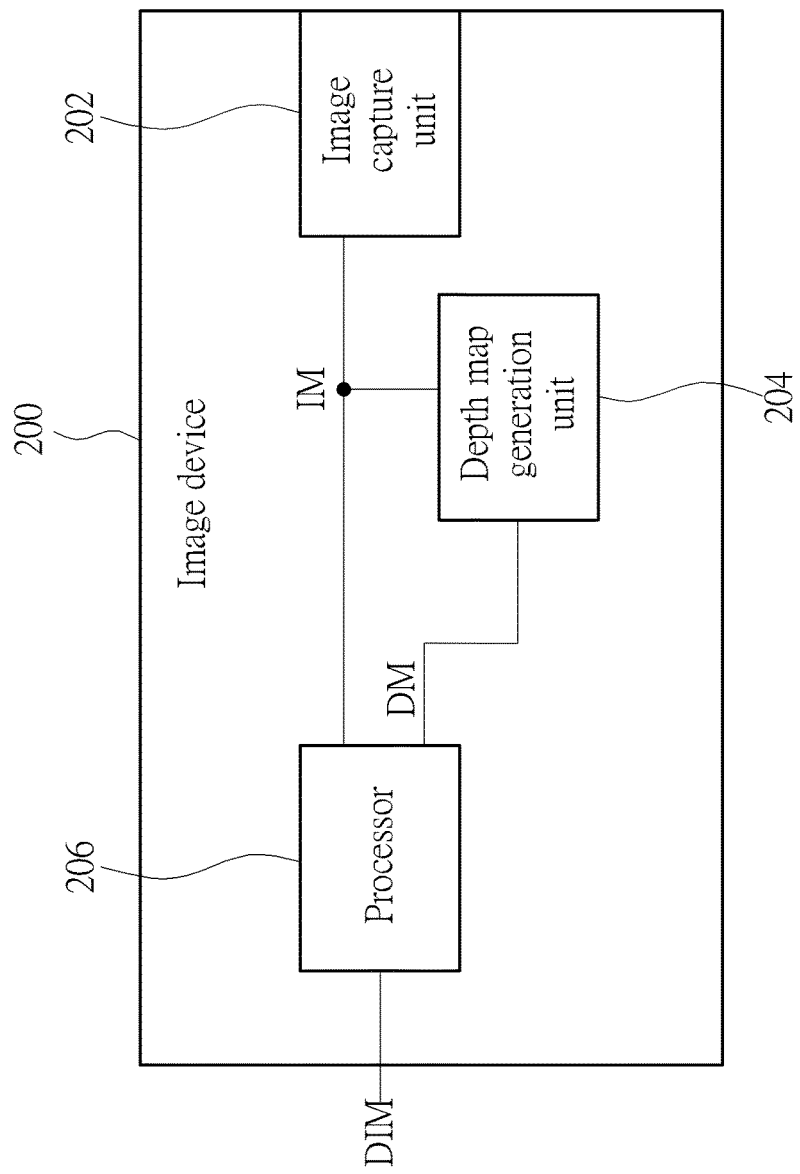
FIG. 2 is a diagram illustrating an image device with image defocus function according to a first embodiment of the present invention.
Figure 3:
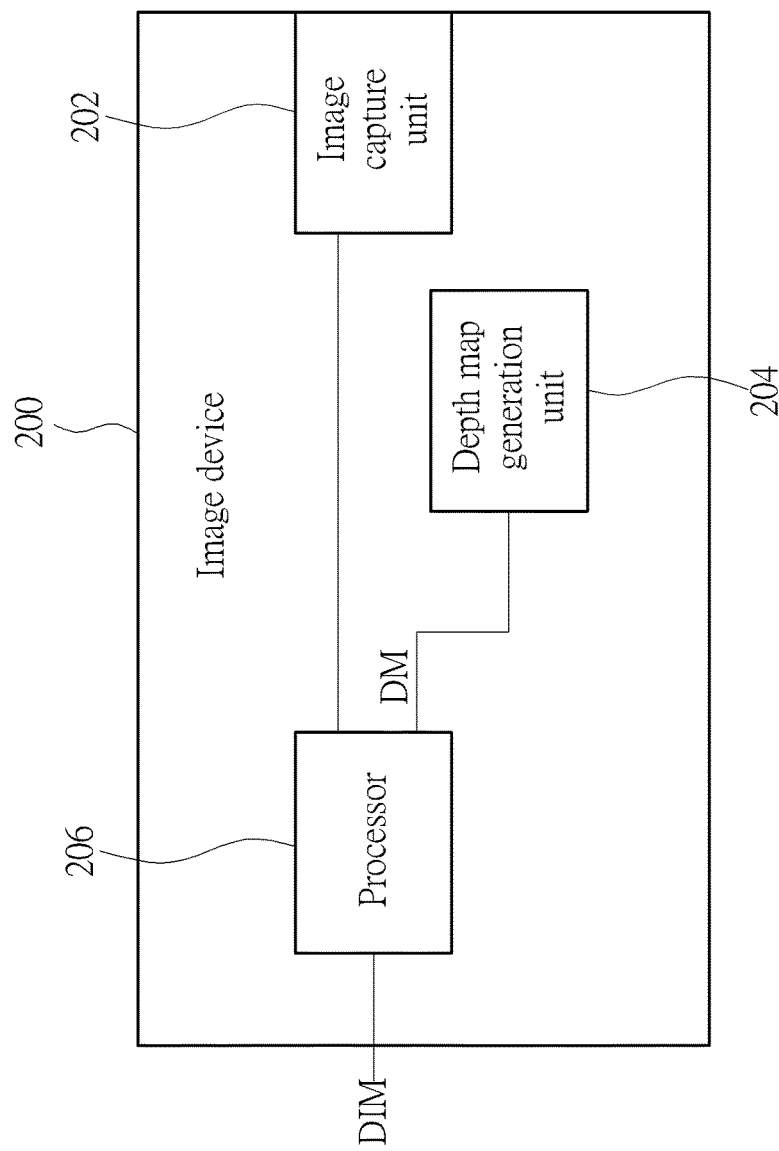
FIG. 3 is a diagram illustrating an image device with image defocus function according to another embodiment of the present invention.

Please refer to FIG. 2. FIG. 2 is a diagram illustrating an image device 200 with image defocus function according to a first embodiment of the present invention. As shown in FIG. 2, the image device 200 includes an image capture unit 202, a depth map generation unit 204, and a processor 206. The image capture unit 200 is used for capturing an image IM corresponding to an object (not shown in FIG. 2). The depth map generation unit 204 is coupled to the image capture unit 202 for generating a depth map DM corresponding to the object according to the image IM. But, in another embodiment of the present invention (as shown in FIG. 3), because the depth map generation unit 204 is not electrically connected to the image capture unit 202, the depth map generation unit 204 generates the depth map DM corresponding to the object directly according to the object. The processor 206 is coupled to the image capture unit 202 and the depth map generation unit 204 for generating a defocus index corresponding to each pixel image of the image IM (wherein the each pixel image of the image IM corresponding to a pixel of the image capture unit 202) according to a depth of the depth map DM corresponding to the each pixel image, a predetermined depth (that is, a desired depth corresponding to the each pixel image) corresponding to the each pixel image, and equation (1). For example, the processor 206 can generate a defocus index DI corresponding to a pixel image P of the image IM according to a depth d of the depth map DM corresponding to the pixel image P of the image IM, a predetermined depth df corresponding to the pixel image P of the image IM, and equation (1), wherein the defocus index DI is used for determining a defocus level of the pixel image P (that is, the defocus level of the pixel image P is increased with increase of the defocus index DI), and the predetermined depth df is increased with increase of a difference between the depth d of the depth map DM corresponding to the pixel image P and a depth of the depth map DM corresponding to a predetermined object:

$$DI = a \times |d - df| \quad (1)$$

As shown in equation (1), because the predetermined depth df is increased with the increase of the difference between the depth d of the depth map DM corresponding to the pixel image P and the depth of the depth map DM corresponding to the predetermined object, the defocus index DI corresponding to the pixel image P is also increased with the increase of the difference, wherein a is a coefficient. In addition, in another embodiment of the present invention, the processor 206 generates the defocus index corresponding to the pixel image P according to a disparity in the depth map DM corresponding to the pixel image P of the image IM, a predetermined disparity corresponding to the pixel image P, and equation (1). That is to say, meanwhile, d shown in equation (1) represents the disparity in the depth map DM corresponding to the pixel image P of the image IM and df shown in equation (1) represents the predetermined disparity corresponding to the pixel image P.

In addition, in another embodiment of the present invention, the processor 206 can also generate the defocus index DI corresponding to the pixel image P according to the depth d of the depth map DM corresponding to the pixel image P of the image IM, the predetermined depth df corresponding to the pixel image P of the image IM, and equation (2):

$$DI = \Sigma a_n \times |d - df|^n \quad (2)$$

As shown in equation (2), $a_n$ is a coefficient of an $n^{th}$ order polynomial. In addition, the present invention is not limited to the processor 206 generating the defocus index DI corresponding to the pixel image P according to equation (1) or equation (2). That is to say, any equation utilized by the processor 206 to make the defocus index DI corresponding to the pixel image P be increased with the increase of the difference falls within the scope of the present invention.

Figure 4:
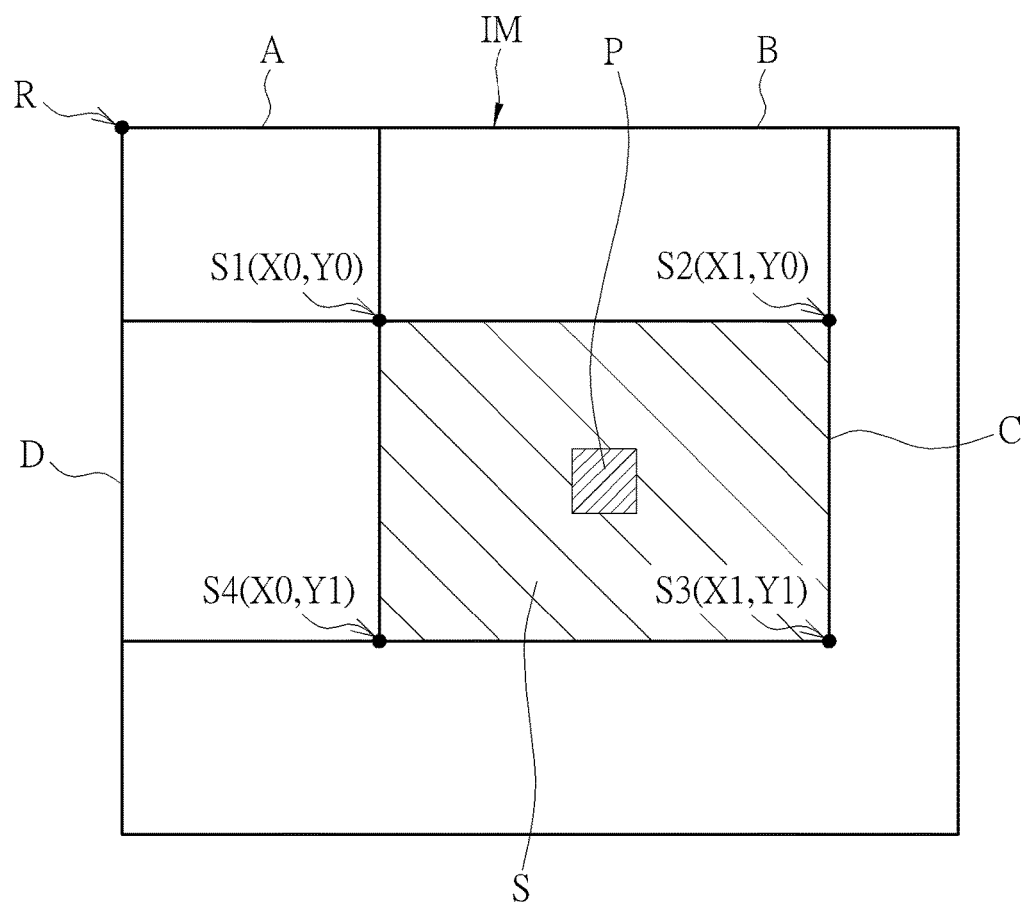
FIG. 4 is a diagram illustrating an integration block corresponding to the pixel image.

After the processor 206 generates the defocus index DI corresponding to the pixel image P, the processor 206 can determine an integration block S (as shown in FIG. 4) corresponding to the pixel image P according to a coordinate (XP, YP) of the pixel image P in the image IM and the defocus index DI corresponding to the pixel image P, wherein the processor 206 can determine coordinates (X0, Y0), (X1, Y0), (X1, Y1), (X0, Y1) of 4 vertexes S1-S4 of the integration block S respectively according to the coordinate (XP, YP) of the pixel image P in the image IM, the defocus index DI corresponding to the pixel image P, and equation (3), the pixel image P is located at a center of the integration block S, and as shown in FIG. 4, the integration block S is a rectangle:

$$X0 = XP - DI - 1$$
$$X1 = XP + DI \quad (3)$$
$$Y0 = YP - DI - 1$$
$$Y1 = YP + DI$$

As shown in equation (3), an area of the integration block S corresponding to the pixel image P is in positive correlation to the defocus index DI corresponding to the pixel image P. As shown in FIG. 4, an integration block A is a rectangle defined by the vertex S1 and a point R, an integration block B is a rectangle defined by the vertex S2 and the point R, an integration block C is a rectangle defined by the vertex S3 and the point R, and an integration block D is a rectangle defined by the vertex S4 and the point R. Therefore, the processor 206 can determine an integral image CPVS corresponding to the integration block S according to equation (4), and store the integral image CPVS corresponding to the integration block S in a memory (not shown in FIG. 2) of the processor 206:

$$CPVS = CPVA + CPVC - CPVB - CPVD \quad (4)$$

As shown in equation (4), CPVA is an integral image corresponding to all pixel images of the integration block A of the image IM, CPVB is an integral image corresponding to all pixel images of the integration block B of the image IM, CPVC is an integral image corresponding to all pixel images of the integration block C of the image IM, and CPVD is an integral image corresponding to all pixel images of the integration block D of the image IM, wherein the method of generating the integral image CPVA, the integral image CPVB, the integral image CPVC, and the integral image CPVD is well-known for those skilled in the art, so further description thereof is omitted for simplicity. In addition, because before the processor 206 determines the integral image CPVS corresponding to the integration block S, the processor 206 has first generated the integral image CPVA corresponding to the all pixel images of the integration block A, the integral image CPVB corresponding to the all pixel images of the integration block B, the integral image CPVC corresponding to the all pixel images of the integration block C, and the integral image CPVD corresponding to the all pixel images of the integration block D, and stored the integral image CPVA, the integral image CPVB, the integral image CPVC, and the integral image CPVD in the memory of the processor 206, the processor 206 can quickly determine the integral image CPVS corresponding to the integration block S according to equation (4).

Figure 5:
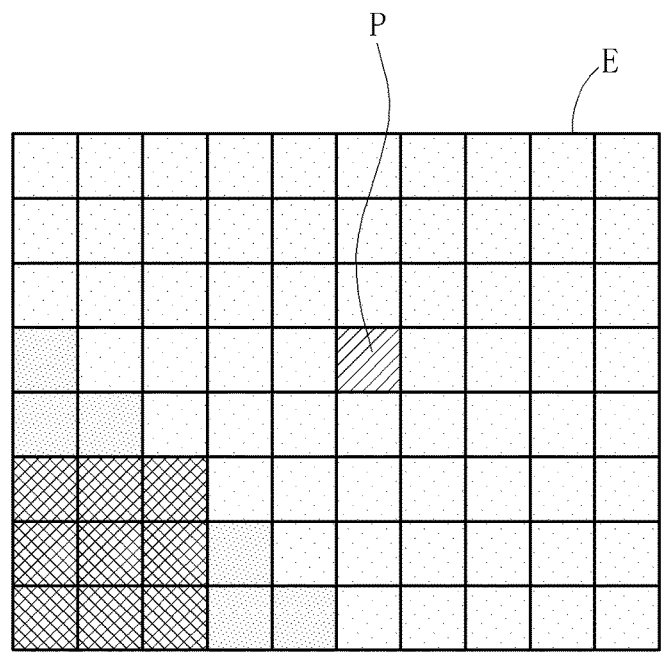
FIG. 5 is a diagram illustrating an integration block corresponding to the pixel image being not a rectangle.
Figure 5:
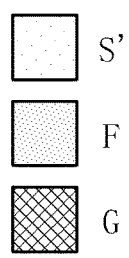

In addition, the integral images CPVA, CPVC, CPVB, CPVD can be RGB integral images, YUV integral images, or gray level values. In addition, in another embodiment of the present invention, if an integration block S' corresponding to the pixel image P determined by the processor 206 according to the coordinate (XP, YP) of the pixel image P in the image IM is not a rectangle (as shown in FIG. 5), the processor 206 can first utilize the above mentioned method of determining the integration block S to generate a rectangular integration block E, six rectangular integration blocks F, and a rectangular integration block G, and then utilize the rectangular integration block E, the six rectangular integration blocks F, and the rectangular integration block G to determine the integration block S'(that is, S'=E−F−G).

After the processor 206 determines the integral image CPVS corresponding to the integration block S according to equation (4), the processor 206 can calculate an area AR of the integration block S according to the coordinates (X0, Y0), (X1, Y0), (X1, Y1), (X0, Y1) of the 4 vertexes S1-S4 and equation (5), and calculate a defocus color pixel value corresponding to the pixel image P according to the integral image CPVS corresponding to the integration block S, the area AR of the integration block S, and equation (6).

$$AR=(X1-X0)*(Y1-Y0) \quad (5)$$

$$DCPV=CPVS/AR \quad (6)$$

After the processor 206 calculates the defocus color pixel value corresponding to the pixel image P, the processor 206 can also calculate defocus color pixel values corresponding to other pixel images of the image IM according to the above mentioned principle of the processor 206 calculating the defocus color pixel value corresponding to the pixel image P. After the processor 206 calculates defocus color pixel values corresponding to all pixel images of the image IM, the processor 206 can output a defocus image DIM corresponding to the image IM according to the defocus color pixel values corresponding to the all pixel images of the image IM.

Figure 6:
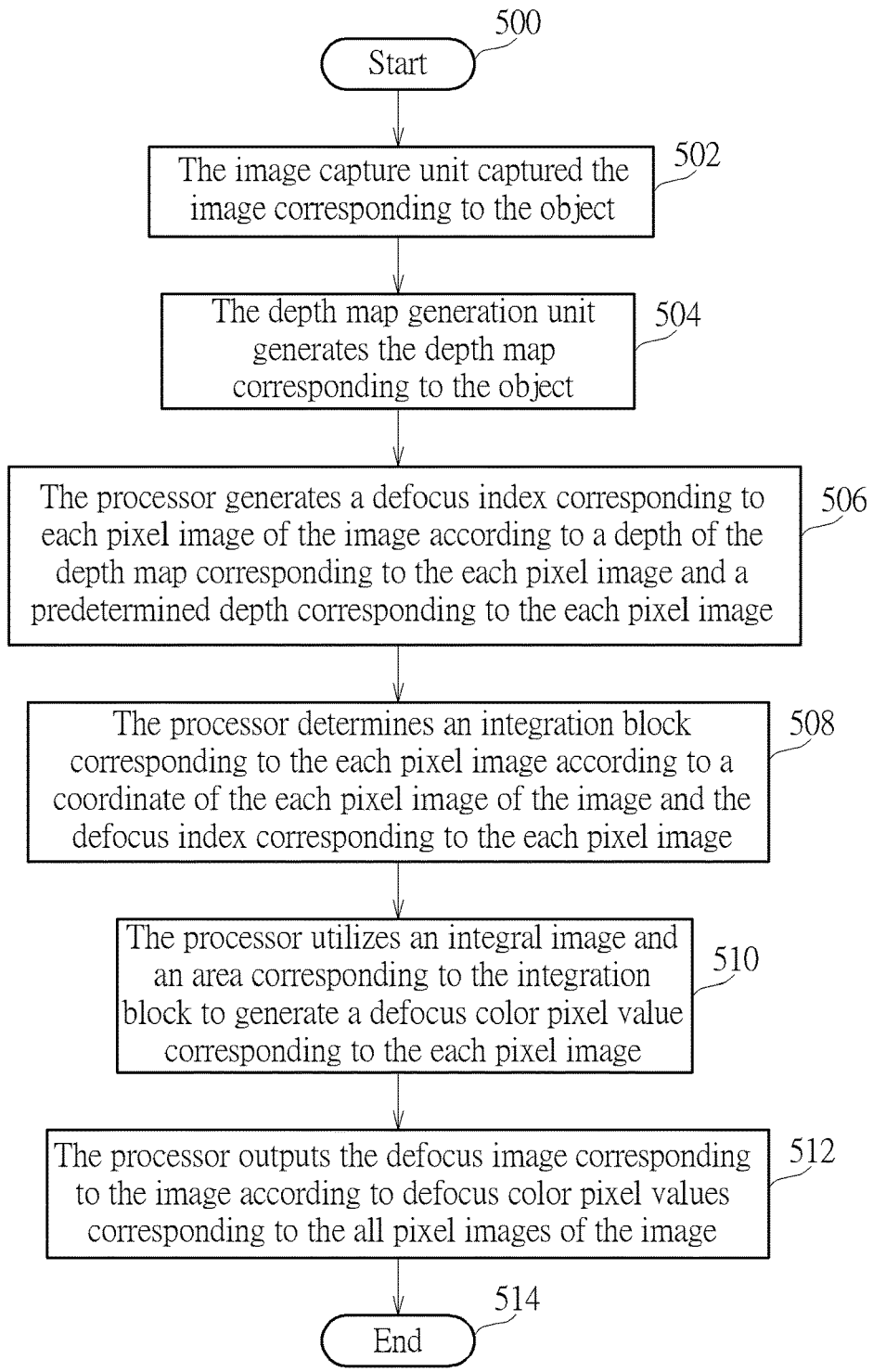
FIG. 6 is a flowchart illustrating a method of an image device generating a defocus image according to a second embodiment of the present invention.

Please refer to FIGS. 2, 4, 6. FIG. 6 is a flowchart illustrating a method of an image device generating a defocus image according to a second embodiment of the present invention. The method in FIG. 6 is illustrated using the image device 200 in FIG. 2. Detailed steps are as follows:

Step 500: Start.

Step 502: The image capture unit 202 captured the image IM corresponding to the object.

Step 504: The depth map generation unit 204 generates the depth map DM corresponding to the object.

Step 506: The processor 206 generates a defocus index corresponding to each pixel image of the image IM according to a depth of the depth map DM corresponding to the each pixel image and a predetermined depth corresponding to the each pixel image.

Step 508: The processor 206 determines an integration block corresponding to the each pixel image according to a coordinate of the each pixel image of the image IM and the defocus index corresponding to the each pixel image.

Step 510: The processor 206 utilizes an integral image and an area corresponding to the integration block to generate a defocus color pixel value corresponding to the each pixel image.

Step 512: The processor 206 outputs the defocus image DIM corresponding to the image IM according to defocus color pixel values corresponding to the all pixel images of the image IM.

Step 514: End.

In Step 506, as shown in FIG. 2, the processor 206 can generate the defocus index corresponding to the each pixel image of the image IM according to the depth of the depth map DM corresponding to the each pixel image of the image IM and the predetermined depth corresponding to the each pixel image of the image IM (that is, the desired depth corresponding to the each pixel image of the image IM), and equation (1). For example, the processor 206 can generate the defocus index DI corresponding to the pixel image P according to the depth d of the depth map DM corresponding to the pixel image P of the image IM, the predetermined depth df corresponding to the pixel image P of the image IM, and equation (1), wherein the defocus index DI is used for determining the defocus level of the pixel image P (that is, the defocus level of the pixel image P is increased with the increase of the defocus index DI), and the predetermined depth df is increased with the increase of the difference between the depth d of the depth map DM corresponding to the pixel image P and the depth of the depth map DM corresponding to the predetermined object.

As shown in equation (1), because the predetermined depth df is increased with the increase of the difference between the depth d of the depth map DM corresponding to the pixel image P and the depth of the depth map DM corresponding to the predetermined object, the defocus index DI corresponding to the pixel image P is also increased with the increase of the difference. In addition, in another embodiment of the present invention, the processor 206 generates the defocus index corresponding to the pixel image P according to the disparity in the depth map DM corresponding to the pixel image P of the image IM, the predetermined disparity corresponding to the pixel image P, and equation (1). That is to say, meanwhile, d shown in equation (1) represents the disparity in the depth map DM corresponding to the pixel image P of the image IM and df shown in equation (1) represents the predetermined disparity corresponding to the pixel image P.

In addition, in another embodiment of the present invention, the processor 206 can also generate the defocus index DI corresponding to the pixel image P according to the depth d of the depth map DM corresponding to the pixel image P of the image IM, the predetermined depth df corresponding to the pixel image P of the image IM, and equation (2). In addition, the present invention is not limited to the processor 206 generating the defocus index DI corresponding to the pixel image P according to equation (1) or equation (2). That is to say, any equation utilized by the processor 206 to make the defocus index DI corresponding to the pixel image P be increased with the increase of the difference falls within the scope of the present invention.

In Step 508, after the processor 206 generates the defocus index DI corresponding to the pixel image P, the processor 206 can determine the integration block S (as shown in FIG. 4) corresponding to the pixel image P according to the coordinate (XP, YP) of the pixel image P in the image IM and the defocus index DI corresponding to the pixel image P, wherein the processor 206 can determine the coordinates (X0, Y0), (X1, Y0), (X1, Y1), (X0, Y1) of the 4 vertexes S1-S4 of the integration block S respectively according to the coordinate (XP, YP) of the pixel image P in the image IM, the defocus index DI corresponding to the pixel image P, and equation (3), and the pixel image P is located at the center of the integration block S.

As shown in equation (3), the area of the integration block S corresponding to the pixel image P is in positive correlation to the defocus index DI corresponding to the pixel image P. As shown in FIG. 4, the integration block A is the rectangle defined by the vertex S1 and the point R, the integration block B is the rectangle defined by the vertex S2 and the point R, the integration block C is the rectangle defined by the vertex S3 and the point R, and the integration block D is the rectangle defined by the vertex S4 and the point R. Therefore, the processor 206 can determine the integral image CPVS corresponding to the integration block S according to equation (4), and store the integral image CPVS corresponding to the integration block S in the memory of the processor 206, wherein the integral images CPVA, CPVC, CPVB, CPVD can be RGB integral images, YUV integral images, or gray level values. In addition, because before the processor 206 determines the integral image CPVS corresponding to the integration block S, the processor 206 has first generated the integral image CPVA, the integral image CPVB, the integral image CPVC, and the integral image CPVD, and stored the integral image CPVA, the integral image CPVB, the integral image CPVC, and the integral image CPVD in the memory of the processor 206, the processor 206 can quickly determine the integral image CPVS corresponding to the integration block S according to equation (4).

In Step 510, after the processor 206 determines the integral image CPVS corresponding to the integration block S according to equation (4), the processor 206 can calculate the area AR of the integration block S according to the coordinates (X0, Y0), (X1, Y0), (X1, Y1), (X0, Y1) of the 4 vertexes S1-S4 and equation (5), and calculate the defocus color pixel value corresponding to the pixel image P according to integral image CPVS corresponding to the integration block S, the area AR of the integration block S, and equation (6).

In Step 512, after the processor 206 calculates the defocus color pixel value corresponding to the pixel image P, the processor 206 can also calculate the defocus color pixel values corresponding to the other pixel images of the image IM according to the above mentioned principle of the processor 206 calculating the defocus color pixel value corresponding to the pixel image P. After the processor 206 calculates the defocus color pixel values corresponding to the all pixel images of the image IM, the processor 206 can output the defocus image DIM corresponding to the image IM according to the defocus color pixel values corresponding to the all pixel images of the image IM.

To sum up, the image device and the related method thereof utilize the processor to determine an integration block corresponding to each pixel image of an image according to a depth of a depth map corresponding to the image corresponding to the each pixel image and a predetermined depth corresponding to the each pixel image, to generate a defocus color pixel value corresponding to the each pixel image according to the integration block corresponding to the each pixel image, and to output a defocus image corresponding to the image according to defocus color pixel values corresponding to all pixels of the image. Because an operation load of the processor generating an integral image corresponding to all pixel images of the integration block corresponding to the each pixel image is not significantly increased with increase of a difference between the depth of the depth map corresponding to the each pixel image and a depth of the depth map corresponding to a predetermined object, compared to the prior art, an operation load and time consumption of the image device and the related method thereof when the image device and the related method thereof execute defocus operation can be significantly reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image device with image defocus function, comprising:
an image capture unit capturing an image corresponding to an object;
a depth map generation unit generating a depth map corresponding to the object;
a processor coupled to the image capture unit and the depth map generation unit for determining an integration block corresponding to each pixel image of the image according to a practical depth of the depth map corresponding to the each pixel image and a variable depth corresponding to the each pixel image, utilizing the integration block to determine an integral image corresponding to the integration block, utilizing the integral image and an area corresponding to the integration block to generate a defocus color pixel value corresponding to the each pixel image, and outputting a defocus image corresponding to the image according to defocus color pixel values corresponding to all pixel images of the image;
wherein the each pixel image of the image corresponds to a pixel of the image capture unit.

2. The image device of claim 1, wherein the processor generates a defocus index corresponding to the each pixel image according to the practical depth corresponding to the each pixel image and the variable depth corresponding to the each pixel image, and determines the integration block corresponding to the each pixel image according to a coordinate of the each pixel image and the defocus index corresponding to the each pixel image.

3. The image device of claim 2, wherein the processor generates the defocus index corresponding to the each pixel image according to the following equation:

$$DI = a \times |d - df|;$$

wherein:
DI is the defocus index corresponding to the each pixel image;
a is a coefficient which makes the defocus index greater than 0;
d is the practical depth corresponding to the each pixel image; and df is the variable depth corresponding to the each pixel image, wherein the variable depth is changed with a predetermined object within the depth map.

4. The image device of claim 2, wherein the processor generates the defocus index corresponding to the each pixel image according to the following equation:

$$DI = \Sigma a_n \times |d - df|^n;$$

wherein:
DI is the defocus index corresponding to the each pixel image;
$a_n$ is a coefficient of an $n^{th}$ order polynomial which makes the defocus index greater than 0;
d is the practical depth corresponding to the each pixel image; and
df is the variable depth corresponding to the each pixel image, wherein the variable depth is changed with a predetermined object within the depth map.

5. A method of an image device generating a defocus image, wherein the image device comprises an image capture unit, a depth map generation unit, and a processor, the method comprising:
the image capture unit capturing an image corresponding to an object;
the depth map generation unit generating a depth map corresponding to the object;
the processor determining an integration block corresponding to each pixel image of the image according to a depth corresponding to the each pixel image and a predetermined depth corresponding to the each pixel image, wherein the each pixel image of the image corresponds to a pixel of the image capture unit;
the processor utilizing the integration block to determine an integral image corresponding to the integration block;
the processor utilizing the integral image and an area corresponding to the integration block to generate a defocus color pixel value corresponding to the each pixel image; and
the processor outputting a defocus image corresponding to the image according to defocus color pixel values corresponding to all pixel images of the image.

6. The method of claim 5, wherein the processor determining the integration block corresponding to the each pixel image comprises:
the processor generating a defocus index corresponding to the each pixel image according to the practical depth corresponding to the each pixel image and the variable depth corresponding to the each pixel image; and
the processor determining the integration block corresponding to the each pixel image according to a coordinate of the each pixel image and the defocus index corresponding to the each pixel image.

7. The method of claim 6, wherein the processor generates the defocus index corresponding to the each pixel image according to the following equation:

$$DI = a \times |d - df|;$$

wherein:
DI is the defocus index corresponding to the each pixel image;
a is a coefficient which makes the defocus index greater than 0;
d is the practical depth corresponding to the each pixel image; and
df is variable depth corresponding to the each pixel image wherein the variable depth is changed with a predetermined object within the depth map.

8. The method of claim 6, wherein the processor generates the defocus index corresponding to the each pixel image according to the following equation:

$$DI = \Sigma a_n \times |d - df|^n;$$

wherein:
DI is the defocus index corresponding to the each pixel image;
$a_n$ is a coefficient of an $n^{th}$ order polynomial which makes the defocus index greater than 0;
d is the practical depth corresponding to the each pixel image; and
df is the variable depth corresponding to the each pixel image, wherein the variable depth is changed with a predetermined object within the depth map.

* * * * *